March 26, 1935.  W. LINNMANN, JR.  1,995,742
LIQUID SEPARATOR
Original Filed Jan. 11, 1929
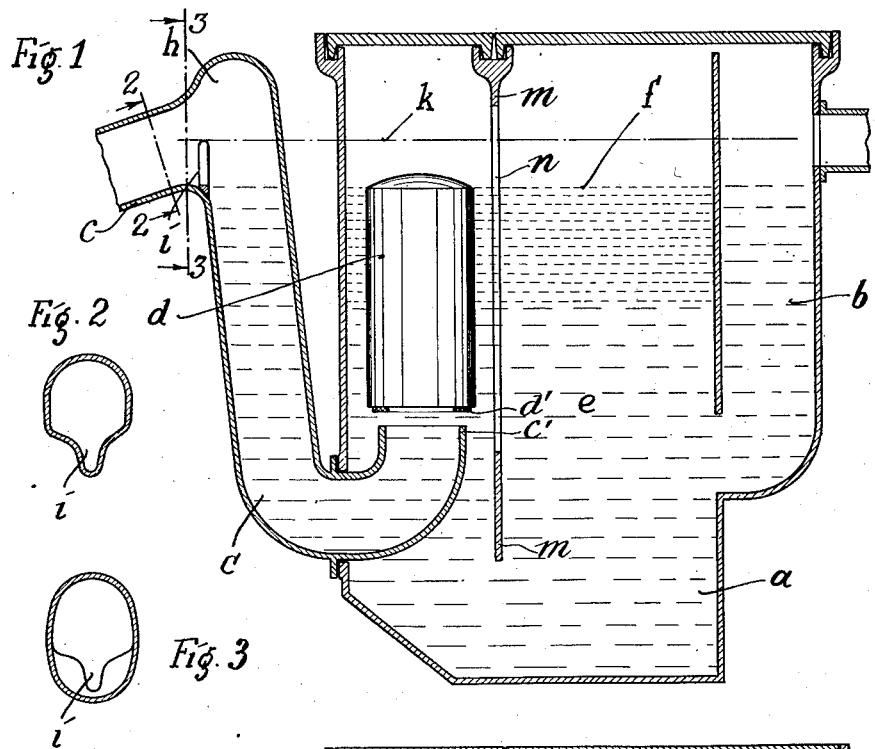
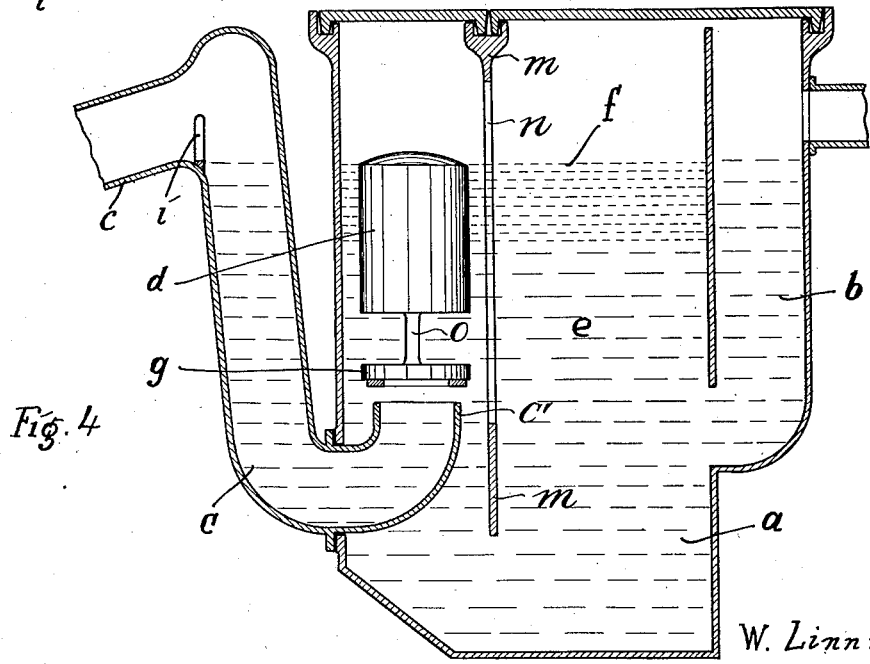
W. Linnmann, jr.
by C. P. Goepel
his Attorney.

Patented Mar. 26, 1935

1,995,742

UNITED STATES PATENT OFFICE 1,995,742

LIQUID SEPARATOR

Wilhelm Linnmann, Jr., Droegen-Nindorf, Germany

Application January 11, 1929, Serial No. 331,887 Renewed November 10, 1933. In Germany January 21, 1928

4 Claims. (Cl. 210—56)

My invention relates to improvements in separators for liquids of different specific gravities such as benzene and water, and more particularly in separators comprising a casing enclosing a float valve and connected with the supply of water loaded with benzene and a discharge for the water. The object of the improvements is to provide an apparatus in which the benzene is not carried away through the discharge pipe even when there is an increased supply thereof. With this object in view my invention consists in disposing the seat of the float valve near the bottom part of the casing below the lowest level that the water therein can obtain during normal operation of the apparatus, while the float is located above the valve seat and in contact with both the benzene and water layers.

Another object of the improvements is to provide an apparatus in which the float valve is not pressed on its seat in case of a large supply and discharge of water by the sucking action of the said water, and with this object in view my invention consists in constructing the discharge for the water with an overflow the bottom part of which is of reduced cross-sectional area, so that in case of a sudden supply of a large amount of water the water is at first slowly discharged and the level of the water rises within the receptacle until the water in the discharge conduit is above the reduced portion thereof thus permitting the float valve sufficiently to rise away from its seat, so that it is not pressed on its seat when the rapid discharge of the water begins.

For the purpose of explaining the invention two examples embodying the same have been shown in the accompanying drawing in which the same reference characters have been used in all the views to indicate corresponding parts. In said drawing, Fig. 1 is a sectional elevation showing the separator, Fig. 2 is a sectional elevation taken on the line 2—2 of Fig. 1, Fig. 3 is a sectional elevation taken on the line 3—3 of Fig. 1, and Fig. 4 is a sectional elevation similar to the one illustrated in Fig. 1 and showing a modification.

In the example shown in Fig. 1 the separator comprises a container $a$ divided by a partition $m$ having a passage $n$ therethrough, into two communicating compartments one of which has an intake $b$ for the water loaded with benzene, and the other is provided with a discharge conduit $c$ for the water having the benzene separated therefrom. The discharge conduit is provided with an upwardly facing discharge opening to provide a valve seat $c^1$ located below the lowest level that the water in the receptacle attains during normal operation of the apparatus. The discharge conduit is also provided with a leg or the like extending upwardly to a point substantially above the discharge opening thereof serving as an overflow determining the level of the liquid within the receptacle $a$, and the overflow is provided at its bottom part with a portion $i$ of reduced cross-sectional area which permits limited flow of water to take place but which causes the level of the water to rise in the leg of the discharge conduit and in the receptacle in order to permit the discharge of large amounts of water therethrough.

The seat $c^1$ is located near the bottom part of the left hand chamber of the receptacle $a$ and at the part $e$ thereof below the lowest normal operating level of the water in the receptacle. Above the seat $c^1$ there is a float $d$ provided at its bottom with a valve $d^1$, the said float having its top part continuously in contact with both layers of liquid in the receptacle and extending downwardly to a point substantially below the level of the heavier liquid and above the valve seat $c^1$.

In the operation of the apparatus the impure water is supplied through the intake $b$, which, as shown, may be cast onto the side of the receptacle $a$ and the benzene is separated therefrom within the receptacle $a$ where it is collected above the water. The pure water is discharged through the discharge conduit $c$. By disposing the seat $c^1$ near the bottom part of the receptacle $a$ it is located far away from the benzene collected above the water, so that there is no danger of benzene being carried through the discharge conduit $c$ by the water escaping through the same. The valve $d^1$ is normally open to permit the discharge of water from the receptacle during operation and is only closed when the level of the water in the receptacle sinks below a predetermined level as may occur when the water is depressed by the accumulation of benzene or the lighter liquid above the water. In case of an increased supply of water the discharge of the water through the discharge conduit is at first comparatively slow by reason of the obstructed portion $i$ in the overflow thereof. Therefore the water rises within the receptacle $a$ and removes the float $d$ away from the seat $c^1$. After the level of the water within the pipe $c$ has risen from the level $f$ to the level $k$ the water is rapidly discharged through the top part of the discharge conduit.

However in the meantime the valve $d^1$ has been sufficiently removed from its seat, so that it is not carried downwardly and onto the seat by the flow of the water rushing through the inlet opening of the discharge conduit.

In the modification shown in Fig. 4 the valve $g$ is not directly mounted on the float $d$, but it is connected therewith by a rod $o$. However in both cases the weight of the float and the valve carried thereby is such that the float is constantly in contact with both the layer of benzene and the layer of water.

I claim:

1. An apparatus for separating benzene from other liquids, comprising a receptacle having an intake for the liquid loaded with benzene, a discharge for the liquid freed of benzene having an outlet opening located in the bottom part of the receptacle and an overflow in said discharge, said overflow being of reduced cross sectional area at its bottom part, a float valve adapted to close the intake of said discharge when the liquid in the container is below a predetermined height, and to be unseated when the liquid in the container reaches a predetermined height.

2. An apparatus for separating liquids of different specific gravities such as benzene and water, comprising a receptacle having an intake for the liquids to be separated, a discharge conduit having an outlet opening within said receptacle through which the heavier liquid is discharged from said receptacle, a float valve adapted to close said outlet opening when the level of the heavier liquid falls below a predetermined point, said discharge conduit having an overflow therein formed with an opening in the lower portion thereof permitting the flow of a relatively small amount of liquid therethrough and serving to raise the level of the liquid to the top of the overflow upon a large increase in the supply of liquid whereby said float valve will be moved away from the outlet opening of the discharge conduit when rapid discharge of the heavier liquid is required, thus preventing rapid outflow thereof until the float valve has been moved a substantial distance away from the outlet opening.

3. In apparatus for separating liquids of different specific gravities such as benzene and water in which the lighter liquid forms an upper layer and the heavier liquid forms a lower layer, the combination comprising a receptacle having an inlet through which the liquids to be separated are introduced, a discharge conduit through which the heavier liquid is removed, said discharge conduit having an upwardly facing outlet opening serving as a valve seat located in the lower portion of the receptacle below the lowest level that the heavier liquid can attain during normal operation of the apparatus, said discharge conduit also having a leg extending upwardly to a point substantially above said outlet opening and serving to determine the level of the liquids within the receptacle, a vertically movable float within said receptacle normally located at a higher level than said outlet opening and having a portion thereof in contact with both the upper and lower layers of liquid and a valve carried by the float located above the valve seat on the outlet opening but substantially below the upper point to which the leg of said discharge conduit extends and below the lowest normal operating level of the heavier liquid, said valve being adapted to engage the valve seat on the discharge opening when the level of the heavier liquid in the receptacle falls below a predetermined level to close the outlet opening and prevent removal of the lighter liquid through said discharge conduit.

4. In apparatus for separating liquids of different specific gravities such as benzene and water in which the lighter liquid forms an upper layer and the heavier liquid forms a lower layer, the combination comprising a receptacle, an apertured partition in said receptacle dividing the same into two communicating compartments, each of which has two layers of liquid therein, an inlet communicating with one of said compartments through which the liquids to be separated are introduced into the receptacle, a discharge conduit communicating with the other compartment through which the heavier liquid is removed from the receptacle, said discharge conduit having an upwardly facing outlet opening serving as a valve seat located in the lower portion of the receptacle below the lowest level that the heavier liquid therein can attain during normal operation of the apparatus, and having a leg extending upwardly to a point substantially above said outlet opening and serving to determine the level of the liquids within the receptacle, a float within said receptacle positioned above said outlet opening and in contact with both said upper and lower layers of liquid, said float having a valve thereon positioned below the float and at a point below the lowest normal operating level of the heavier liquid and substantially below the upper point to which the leg of said discharge conduit extends, said valve serving to engage the upwardly facing outlet opening when the level of the heavier liquid in the receptacle falls below a predetermined level to prevent the removal of the lighter liquid through said discharge conduit.

WILHELM LINNMANN, Jr.